United States Patent
Ping et al.

(10) Patent No.: US 10,908,975 B2
(45) Date of Patent: Feb. 2, 2021

(54) COMPUTER SYSTEM ARCHITECTURE

(75) Inventors: Te-Lin Ping, Hsinchu (TW); Shi-Yen Huang, Kaohsiung (TW)

(73) Assignee: NOVATEK MICROELECTRONICS CORP., Hsinchu (TW)

(*) Notice: Subject to any disclaimer, the term of this patent is extended or adjusted under 35 U.S.C. 154(b) by 876 days.

(21) Appl. No.: 13/064,448

(22) Filed: Mar. 25, 2011

(65) Prior Publication Data
US 2011/0235722 A1    Sep. 29, 2011

(30) Foreign Application Priority Data
Mar. 26, 2010  (TW) ............................... 99109253 A

(51) Int. Cl.
*G06F 9/54* (2006.01)
*H04N 19/44* (2014.01)
*H04N 19/42* (2014.01)
*H04N 19/423* (2014.01)

(52) U.S. Cl.
CPC .............. *G06F 9/544* (2013.01); *H04N 19/42* (2014.11); *H04N 19/423* (2014.11); *H04N 19/44* (2014.11)

(58) Field of Classification Search
CPC ......................... H04N 19/44; H04N 21/44004
USPC ....................................... 375/240.25; 710/53
See application file for complete search history.

(56) References Cited

U.S. PATENT DOCUMENTS

| | | | | |
|---|---|---|---|---|
| 4,298,954 A | * | 11/1981 | Bigelow et al. | 710/53 |
| 5,138,440 A | * | 8/1992 | Radice | 348/472 |
| 5,694,332 A | * | 12/1997 | Maturi | 700/94 |
| 5,805,173 A | * | 9/1998 | Glennon | G06T 1/0007 |
| | | | | 345/501 |
| 5,890,003 A | * | 3/1999 | Cutts et al. | 710/263 |
| 6,332,058 B1 | * | 12/2001 | Kawakami | 386/323 |
| 6,438,604 B1 | * | 8/2002 | Kuver et al. | 709/234 |
| 6,542,541 B1 | * | 4/2003 | Luna et al. | 375/240.01 |
| 6,546,156 B1 | * | 4/2003 | Kanzaki et al. | 382/298 |
| 8,073,990 B1 | * | 12/2011 | Baron et al. | 710/22 |
| 2002/0018054 A1 | * | 2/2002 | Tojima | G09G 5/393 |
| | | | | 345/204 |
| 2005/0060521 A1 | * | 3/2005 | Wang | 712/227 |
| 2005/0097620 A1 | * | 5/2005 | Fye | 725/118 |
| 2006/0288390 A1 | * | 12/2006 | Kang et al. | 725/89 |
| 2010/0046630 A1 | * | 2/2010 | Chi | 375/240.25 |

(Continued)

FOREIGN PATENT DOCUMENTS

TW    200823661 A    6/2008

*Primary Examiner* — Rebecca A Volentine
(74) *Attorney, Agent, or Firm* — Rabin & Berdo, P.C.

(57) ABSTRACT

A computer system architecture including a first buffer, a second buffer, a sub-system and a CPU is provided. The sub-system carries out a first task to obtain first returned information, stores the first returned information in the first buffer and sets up a first occupancy flag to the first buffer. Next, the sub-system carries out a second task to obtain second returned information, stores the second returned information in the second buffer, and sets up a second occupancy flag to the second buffer. The CPU reads the first returned information and eliminates the first occupancy flag. After the second returned information is stored in the second buffer and the first occupancy flag is eliminated, the sub-system continuously carries out a third task to obtain third returned information, stores the third returned information in the first buffer, and sets up the first occupancy flag to the first buffer.

11 Claims, 8 Drawing Sheets

(56) References Cited

U.S. PATENT DOCUMENTS

| | | | |
|---|---|---|---|
| 2010/0142931 A1* | 6/2010 | Tran et al. .................... | 386/131 |
| 2010/0180007 A1* | 7/2010 | Suh et al. ..................... | 709/217 |
| 2010/0208830 A1* | 8/2010 | Lowe et al. ............ | 375/240.25 |
| 2010/0211738 A1* | 8/2010 | Abeling et al. .............. | 711/114 |
| 2010/0226442 A1* | 9/2010 | Lin ....................... | H04N 19/61 |
| | | | 375/240.25 |
| 2010/0242041 A1* | 9/2010 | Plondke ............... | G06F 9/3851 |
| | | | 718/103 |
| 2010/0271944 A1* | 10/2010 | Michaelis et al. ........ | 370/230.1 |

* cited by examiner

US 10,908,975 B2

COMPUTER SYSTEM ARCHITECTURE

This application claims the benefit of Taiwan application Serial No. 99109253, filed Mar. 26, 2010, the subject matter of which is incorporated herein by reference.

BACKGROUND OF THE INVENTION

Field of the Invention

The invention relates in general to a computer system architecture, and more particularly to a computer system architecture with fully system overhead tolerance.

Description of the Related Art

In a simple multimedia system, a CPU mainly controls the task of decoding images. Since the image uses macroblock as a basic unit for encoding and decoding, the higher the resolution an image has, the more macroblocks the CPU needs to process during the process of decoding a single image frame. When the operating system is relatively simple, the video decoder, once decoding a macroblock, outputs an interruption instruction to the CPU and waits for the service of the overall system.

However, along with the advance in technologies, more and more complicated hardware elements such as audio decoder and network interface are integrated in multimedia system. In addition, the operating system, such as Linux system with preemptive multitasking, is also getting more and more complicated. As indicated in FIG. 1, after decoding a single frame, the time for the video decoder to output an interruption instruction to the CPU and wait for the CPU to read returned information of the frame also increases. The CPU will not drive the video decoder to decode the next frame unless having finished reading the returned information of the frame. Since many items of application software are integrated, the system load increases, the complexity of the operating system grows, and the idle time for the video decoder to wait for the switching of the CPU or the overall system increases. As a result, the efficiency of the overall system decreases.

SUMMARY OF THE INVENTION

The invention is directed to a computer system architecture, which enables the sub-system to maintain operation under the switching overhead required for the switching of the multiplex operating system, hence increasing the efficiency of the sub-system and improving the performance of the overall system.

According to a first aspect of the present invention, a computer system architecture including a first buffer, a second buffer, a sub-system and a CPU is provided. The sub-system carries out a first task to obtain first returned information, stores the first returned information in the first buffer and sets up a first occupancy flag to the first buffer. Next, the sub-system carries out a second task to obtain second returned information, stores the second returned information in the second buffer, and sets up a second occupancy flag to the second buffer. The CPU reads the first returned information and eliminates the first occupancy flag. After the second returned information is stored in the second buffer and the first occupancy flag is eliminated, the sub-system carries out a third task to obtain a third returned information, stores the third returned information in the first buffer, and sets up the first occupancy flag to the first buffer.

The above and other aspects of the invention will become better understood with regard to the following detailed description of the preferred but non-limiting embodiment(s). The following description is made with reference to the accompanying drawings.

DETAILED DESCRIPTION OF THE INVENTION

The invention provides a computer system architecture, which enables the sub-system to maintain operation under the switching overhead required for the switching of the multiplex operating system, hence increasing the efficiency of the sub-system and improving the performance of the overall system.

Figure 1:
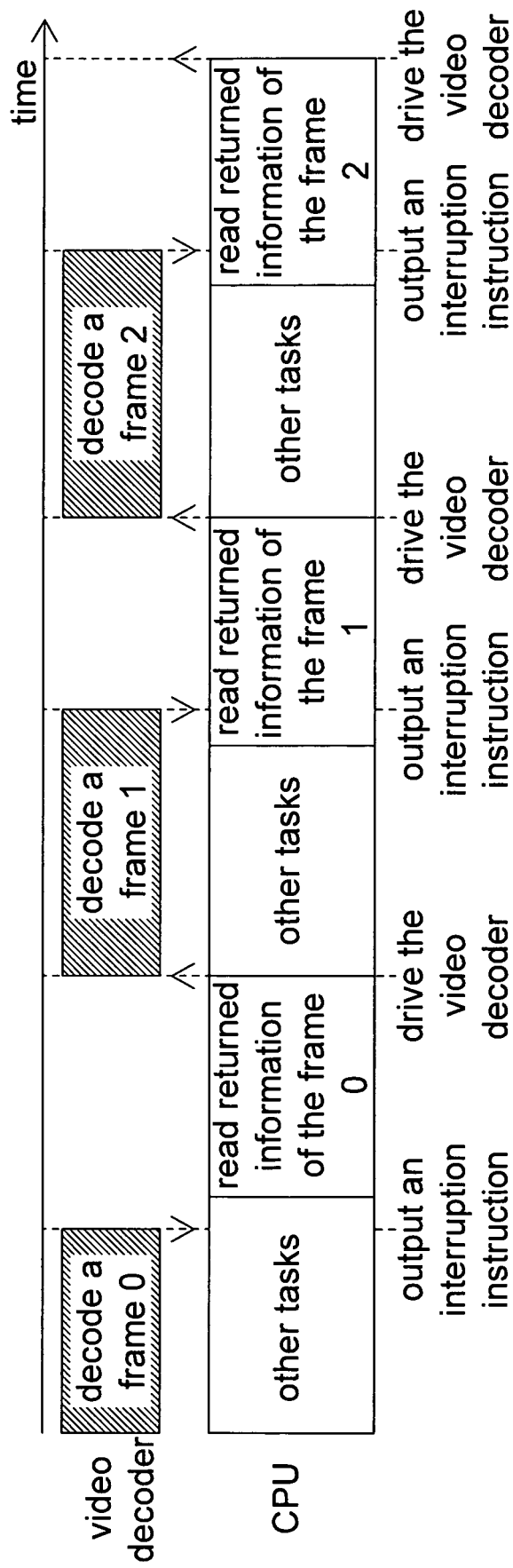
FIG. 1 shows an operation flowchart of a conventional multimedia system.
Figure 2:
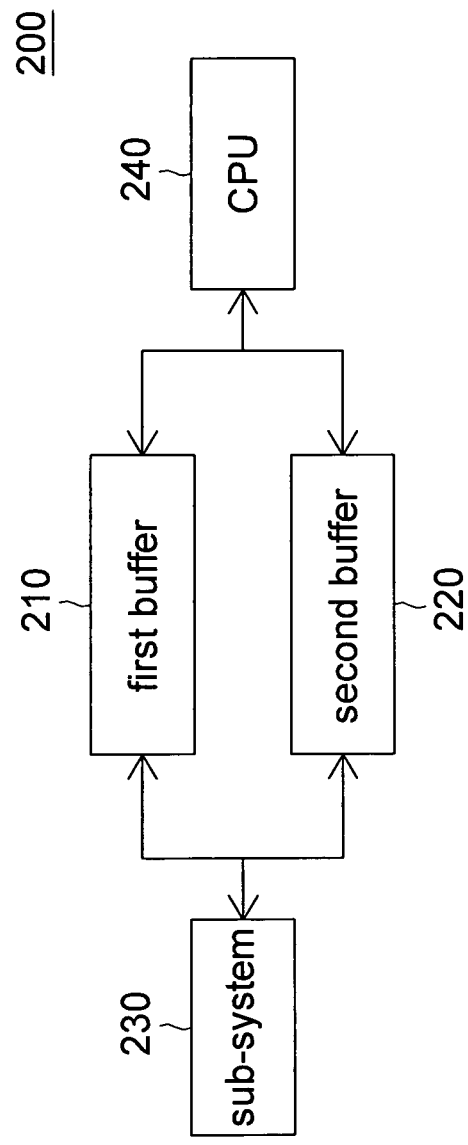
FIG. 2 shows a computer system architecture according to a preferred embodiment of the invention.
Figure 3:
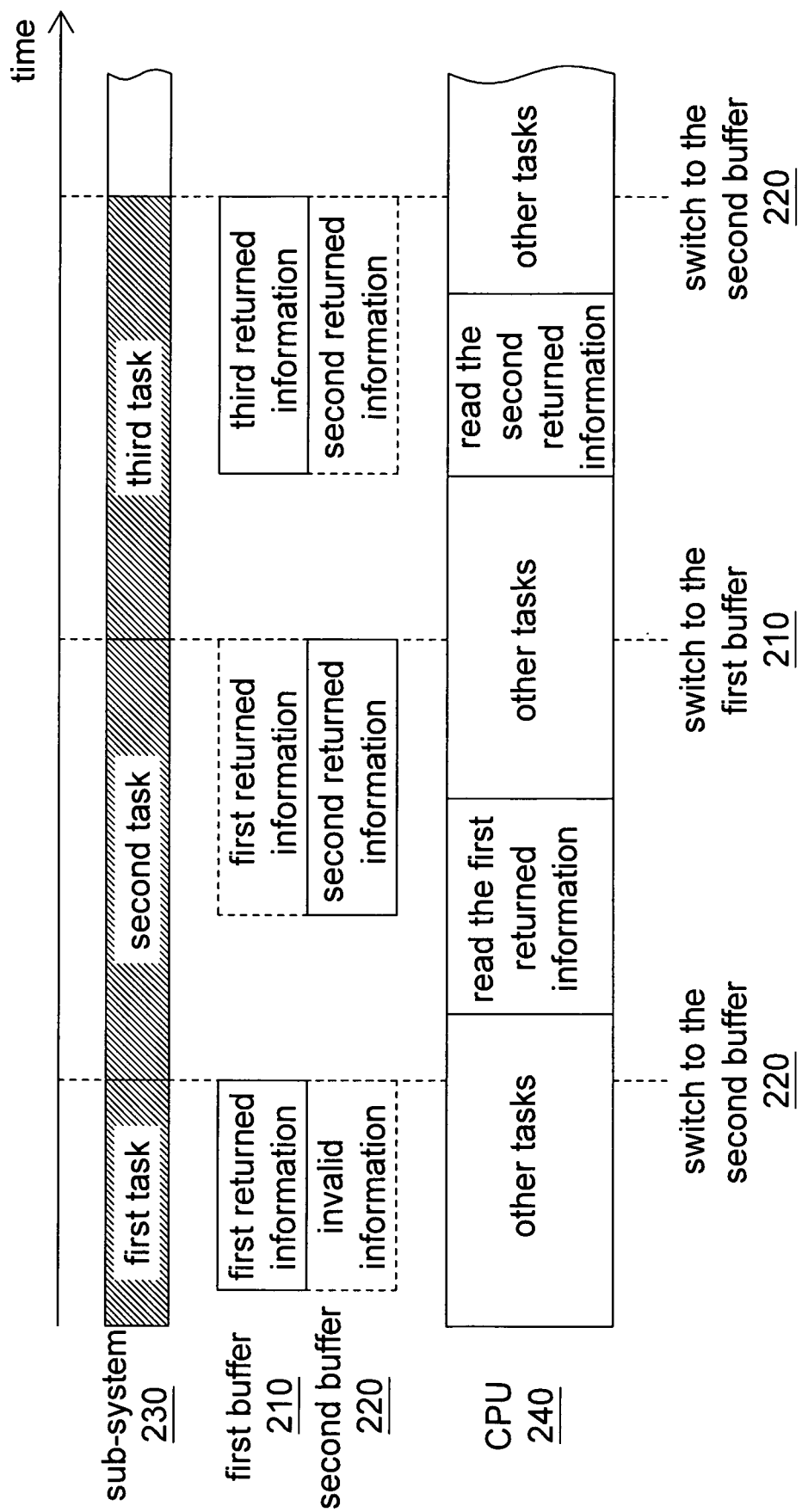
FIG. 3 shows a first operation flowchart of the computer system architecture according to a preferred embodiment of the invention.

Referring to FIG. 2, a computer system architecture according to a preferred embodiment of the invention is shown. The computer system architecture 200 includes a first buffer 210, a second buffer 220, a sub-system 230 and a CPU 240. In FIG. 2, only one single sub-system 230 is illustrated, but the invention is not limited thereto, and the computer system architecture 200 can include multiple, different sub-systems. Referring to FIG. 3, a first operation flowchart of the computer system architecture according to a preferred embodiment of the invention is shown. The sub-system 230 carries out a first task and to obtain first returned information related to the first task. Next, the sub-system 230 stores the first returned information in the first buffer 210, and sets up a first occupancy flag to the first buffer 210. At the same time, the CPU 240 can process other tasks, such as the tasks related to other sub-systems not illustrated in the diagram.

After the first returned information is stored in the first buffer 210, the sub-system 230, without having to wait for the CPU 240 to read the first returned information, can immediately carry out a second task to obtain second returned information. Then, the sub-system 230 stores the second returned information in the second buffer 220, and sets up a second occupancy flag to the second buffer 220. After finishing other tasks, the CPU 240 reads the first returned information from the first buffer 210 and eliminates the first occupancy flag. After reading the first returned information, the CPU 240 then continues to process other tasks.

When the second returned information is stored in the second buffer 220 and the first occupancy flag of the first buffer 210 is eliminated, the sub-system 230, without having to wait for the CPU 240 to read the second returned information, can immediately carry out a third task to obtain third returned information. That is, the sub-system 230 maintains operation under the required switching overhead of the CPU 240. Then, the sub-system 230 stores the third returned information in the first buffer 210, and sets up the first occupancy flag to the first buffer 210.

Besides, the CPU 240 reads the second returned information from the second buffer 220 and eliminates the second occupancy flag. When the third returned information is stored in the first buffer 210 and the second occupancy flag is eliminated, the sub-system 230, without having to wait for the CPU 240 to read the third returned information, immediately carries out a fourth task to obtain fourth returned information. That is, the sub-system 230 maintains operation under the required switching overhead of the CPU 240. Then, the sub-system 230 stores the fourth returned information in the second buffer 220, and sets up the second occupancy flag to the second buffer 220.

Figure 4:
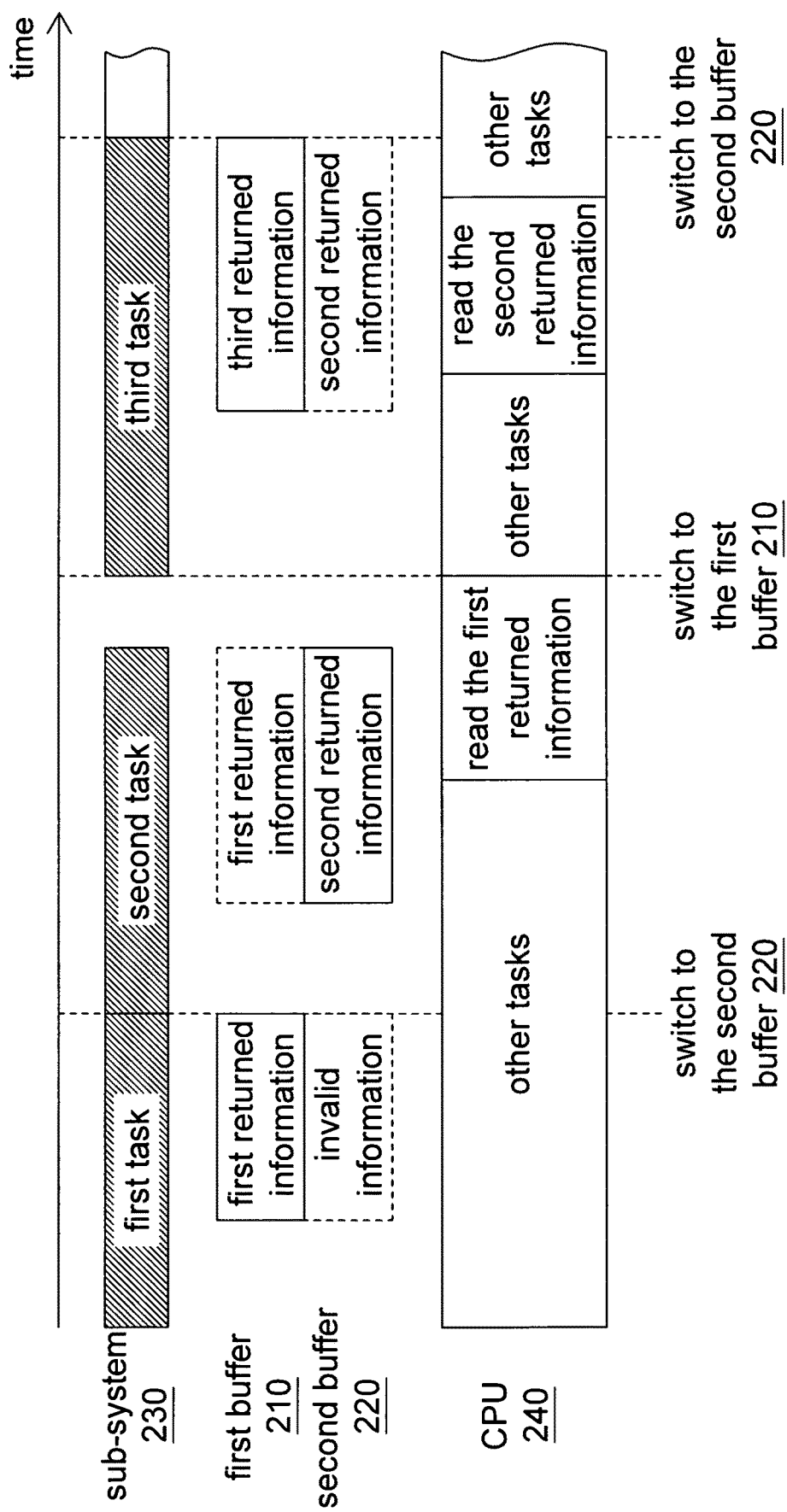
FIG. 4 shows a second operation flowchart of the computer system architecture according to a preferred embodiment of the invention.

However, other tasks carried out by the CPU 240 may be too complicated and time-consuming. Referring to FIG. 4, a second operation flowchart of the computer system architecture according to a preferred embodiment of the invention is shown. As illustrated in FIG. 4, since the CPU 240 spends too much time in carrying out other tasks, the second returned information is already stored in the second buffer 220 but the first returned information stored in the first buffer 210 has not yet been read, so that the first occupancy flag is not yet eliminated. Thus, the sub-system 230, after judging that both the first occupancy flag and the second occupancy flag are not eliminated, will pause operation until the CPU 240 reads the first returned information and eliminates the first occupancy flag. Then, the sub-system 230 continues to carry out the third task.

Similarly, since the CPU 240 spends too much time in carrying out other tasks, the third returned information is already stored in the first buffer 210 but the second returned information stored in the second buffer 220 has not yet been read, the second occupancy flag is not yet eliminated. Thus, the sub-system 230, after judging that both the first occupancy flag and the second occupancy flag are not eliminated, will pause operation until the CPU 240 reads the second returned information and eliminates the second occupancy flag. Then, the sub-system 230 continues to carry out the fourth task.

Figure 5:
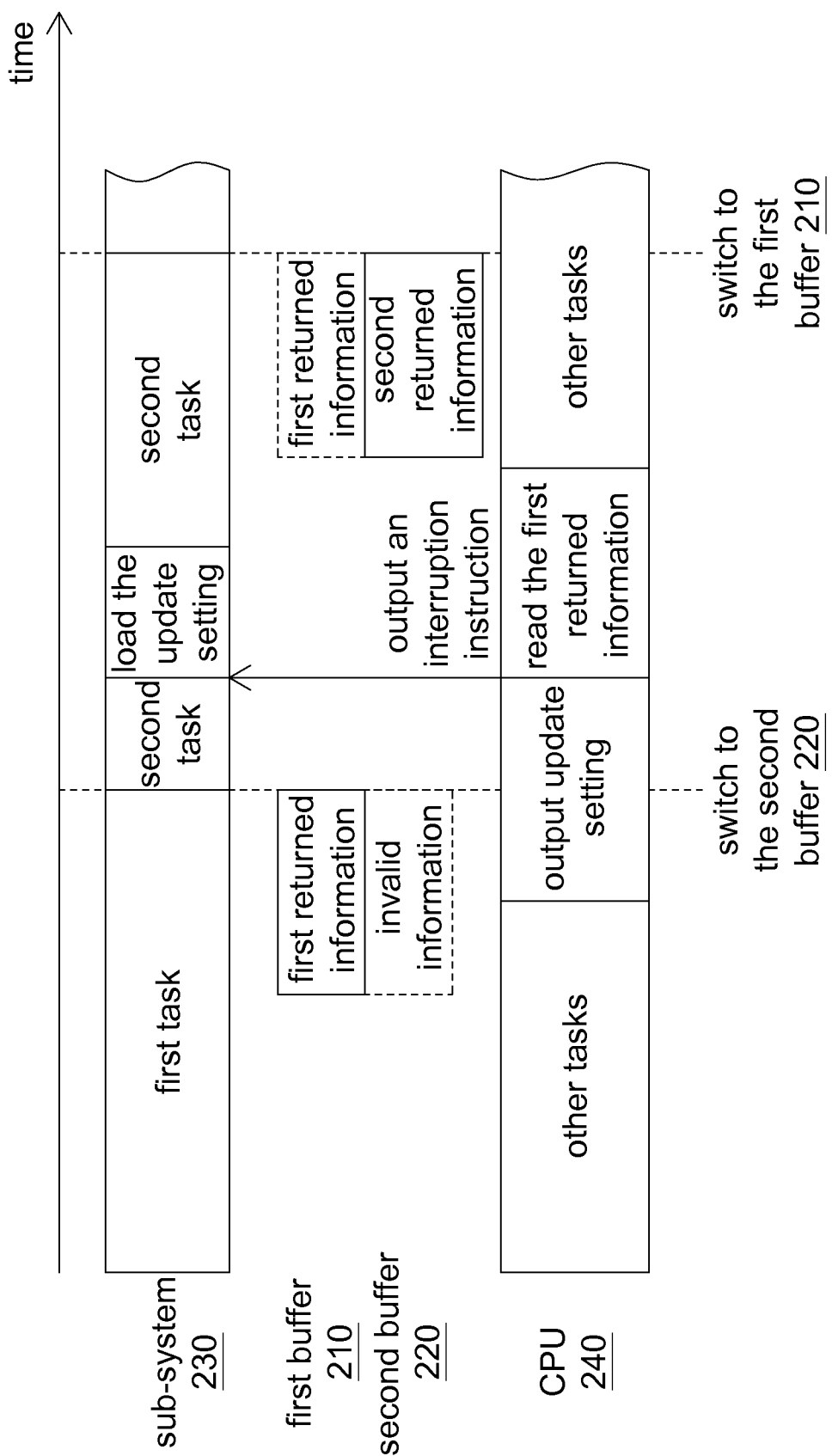
FIG. 5 shows a third operation flowchart of the computer system architecture according to a preferred embodiment of the invention.

During the operation process, the sub-system 230 may still have to exchange information with the CPU 240 so as to update some of the setting and parameters. Referring to FIG. 5, a third operation flowchart of the computer system architecture according to a preferred embodiment of the invention is shown. The computer system architecture 200 includes a memory (not illustrated in the diagram). The CPU 240 writes update setting to the memory and outputs an interruption instruction to the sub-system 230. After receiving the interruption instruction, the sub-system 230 pauses the current task so as to read the update setting from the memory and load the update setting.

Figure 6:
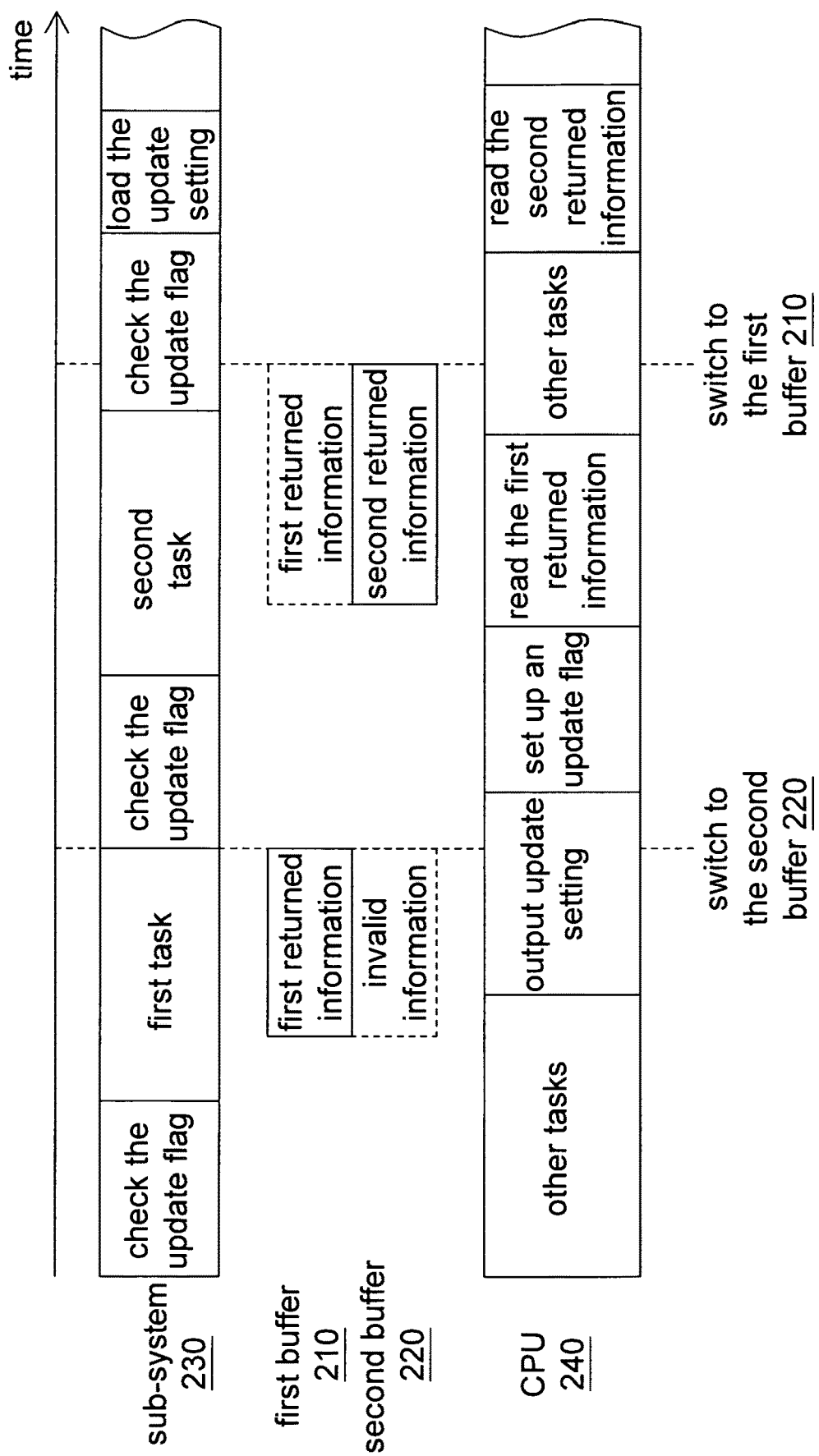
FIG. 6 shows a fourth operation flowchart of the computer system architecture according to a preferred embodiment of the invention.

If the update setting is not real-time, then a fourth operation flowchart of the computer system architecture according to a preferred embodiment of the invention is illustrated in FIG. 6. After writing the update setting to the memory, the CPU 240 will set up an update flag to the memory. Before carrying out each task, the sub-system 230 will check whether an update flag is set up to the memory. If no update flag is set up to the memory, then the sub-system 230 carries out a next task. If an update flag is already set up to the memory, then the sub-system 230, after checking the setup of the update flag, will read the update setting from the memory reads and load in the update setting.

Figure 7:
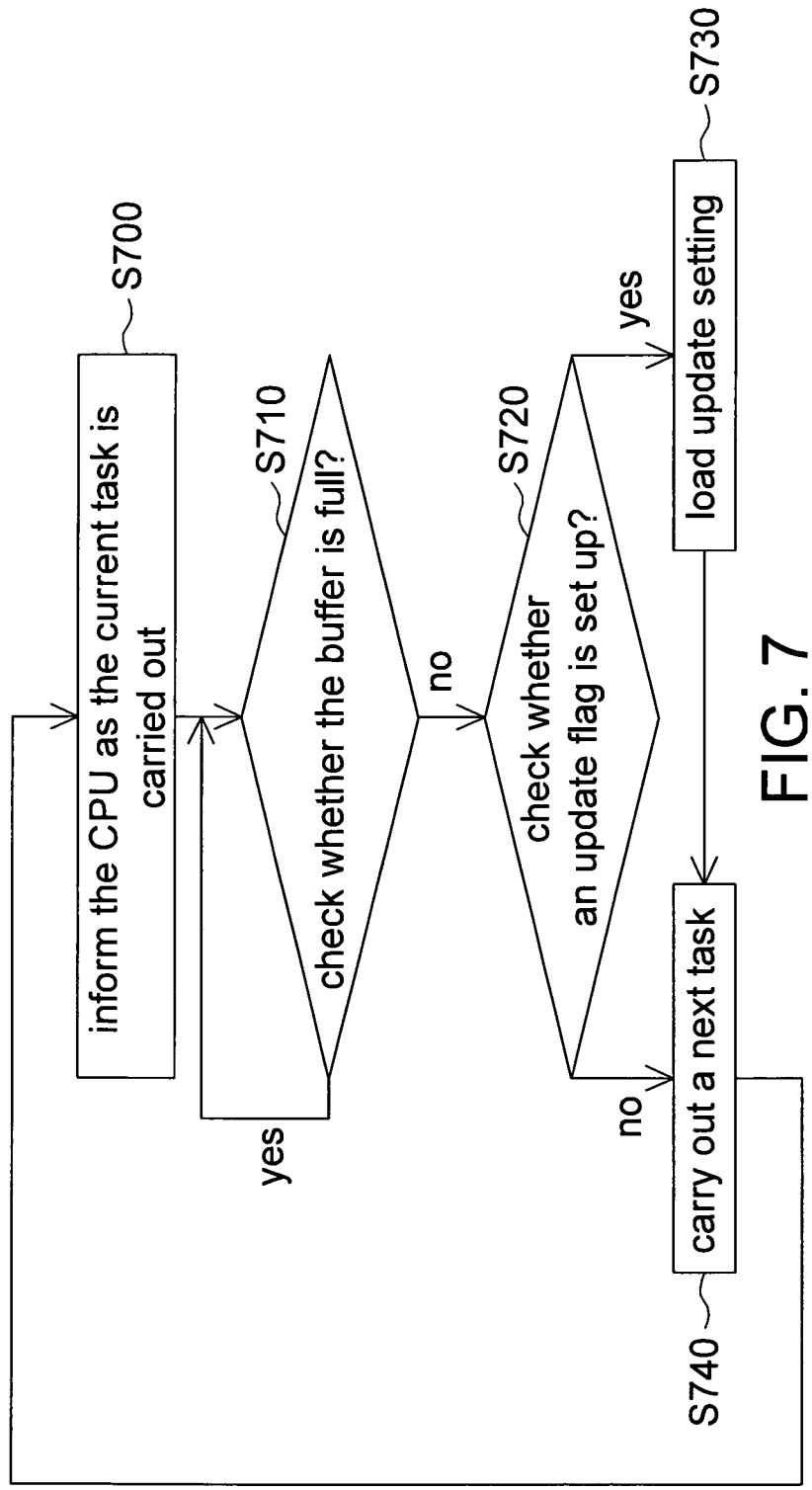
FIG. 7 shows a flowchart of a sub-system according to a preferred embodiment of the invention.

If the update setting is not real-time, a flowchart of a sub-system 230 according to a preferred embodiment of the invention is illustrated in FIG. 7. In step S700, the sub-system 230, after carrying out the current task, outputs an interruption instruction to inform the CPU 240. In step S710, the sub-system judges whether the storage space is full according to whether an occupancy flag is set up to the first buffer 210 and the second buffer 220. If storage space is still available, then the process proceeds to step S720, the sub-system 230 checks whether an update flag is set up to the memory. If no update flag is set up, then the process directly proceeds to step S740, the sub-system 230 carries out a next task. If an update flag is set up, then the process proceeds to step S730, the sub-system 230 loads in the update setting. After that, the process proceeds to step S740, the sub-system 230 carries out a next task.

Figure 8:
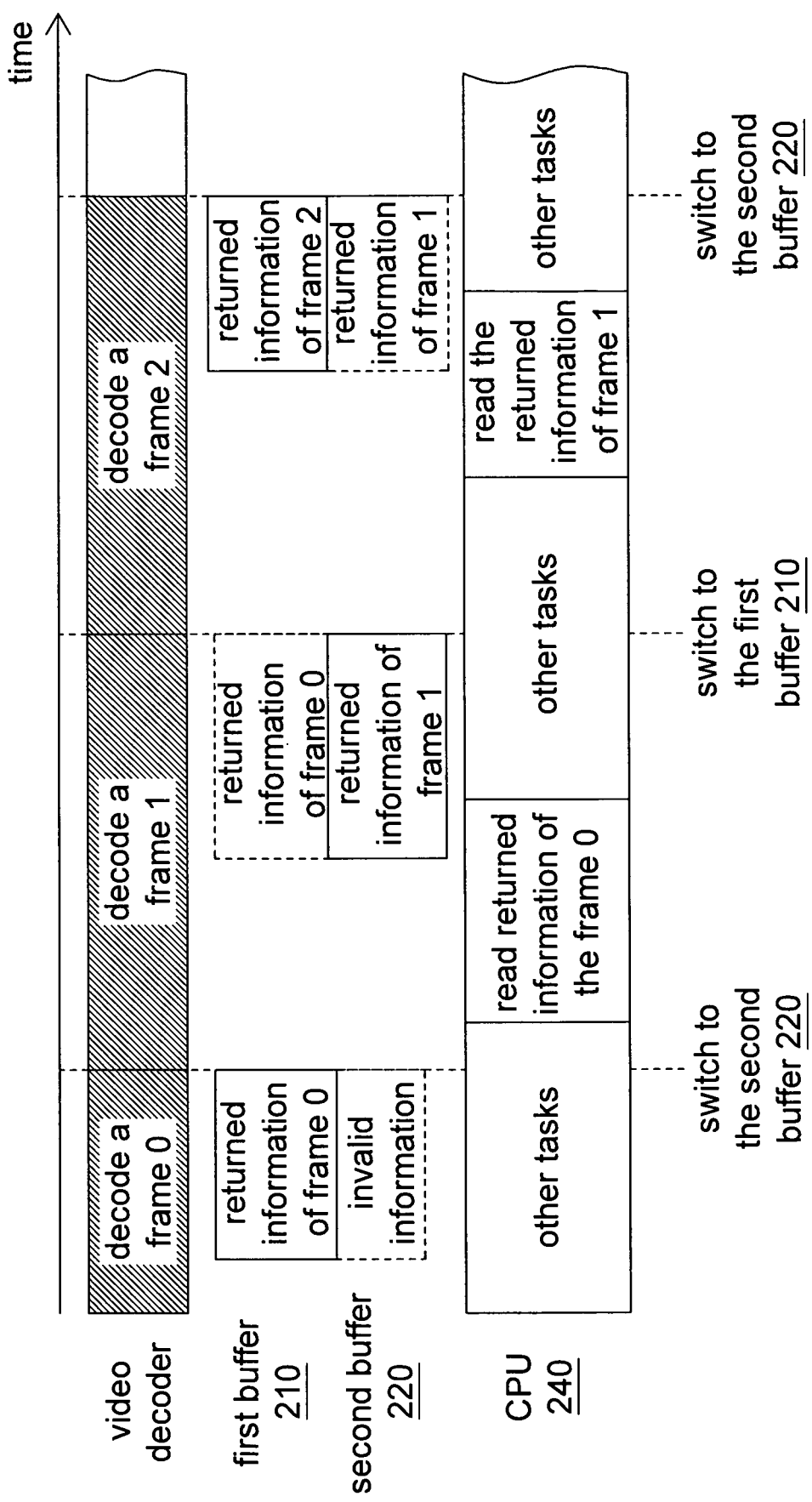
FIG. 8 shows a fifth operation flowchart of the computer system architecture according to a preferred embodiment of the invention.

The above embodiments are exemplified by a sub-system 230 which can be realized by an video decoder. Referring to FIG. 8, a fifth operation flowchart of the computer system architecture according to a preferred embodiment of the invention. The video decoder decodes a frame 0 and to obtain returned information related to the frame 0, wherein examples of the returned information include the storage position of the decoded frame 0, the storage position of the playable frame 0, the type of the frame 0, and other related information such as decoding success or error. Then, the video decoder stores the returned information of the frame 0 in the first buffer 210, and sets up the first occupancy flag to the first buffer 210. At the same time, the CPU 240 can process other tasks, such as the tasks of an audio decoder or a network interface.

After the returned information of the frame 0 is stored in the first buffer 210, the video decoder, without having to wait for the CPU 240 to read the first returned information, subsequently decodes the frame 1 to obtain returned information of the frame 1. Then, the video decoder stores the returned information of the frame 1 in the second buffer 220, and sets up a second occupancy flag to the second buffer 220. After finishing other tasks, the CPU 240 reads the returned information of the frame 0 from the first buffer 210 and eliminates the first occupancy flag. After reading the returned information of the frame 0, the CPU 240 continues to process other tasks.

When returned information of the frame 1 is stored in the second buffer 220 and the first occupancy flag of the first buffer 210 is eliminated, the video decoder, without having to wait for the CPU 240 to read the returned information of the frame 1, subsequently decodes the frame 2 to obtain returned information of the frame 2. That is, the video decoder maintains operation under the required switching overhead of the CPU 240. Then, the video decoder stores the returned information of the frame 2 in the first buffer 210, and sets up a first occupancy flag to the first buffer 210.

Besides, the CPU 240 reads returned information of the frame 1 from the second buffer 220 and eliminates the second occupancy flag. When the returned information of the frame 2 is stored in the first buffer 210 and the second occupancy flag is eliminated, the video decoder, without having to wait for the CPU 240 to read the returned information of the frame 2, subsequently decodes the frame 3 to obtain returned information of the frame 3. That is, the video decoder maintains operation under the required switching overhead of the CPU 240. Then, the video decoder stores the returned information of frame 3 in the second buffer 220, and sets up a second occupancy flag to the second buffer 220.

Figure 9:
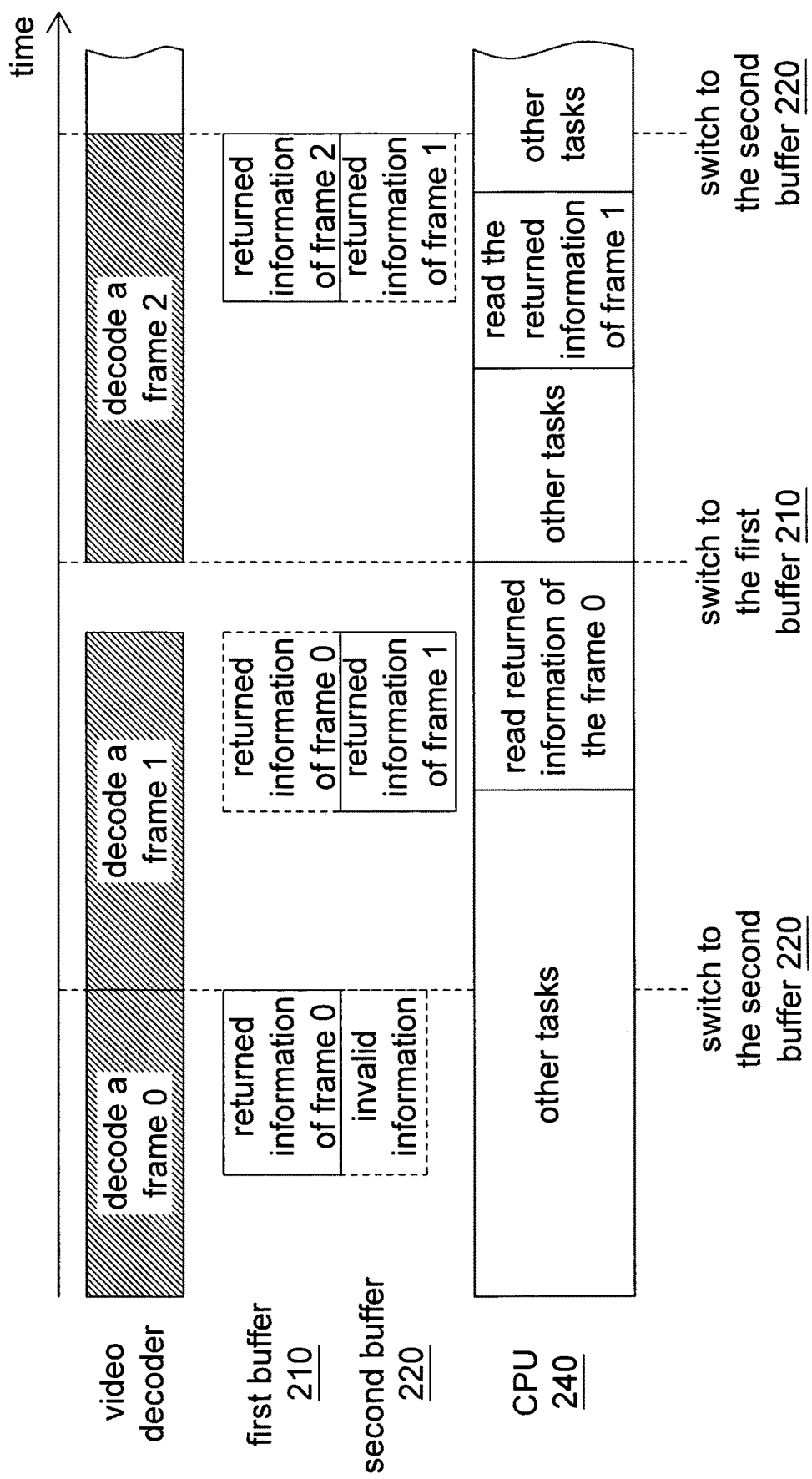
FIG. 9 shows a sixth operation flowchart of the computer system architecture according to a preferred embodiment of the invention.

However, other tasks carried out by the CPU 240 may be too complicated and time-consuming. Referring to FIG. 9, a sixth operation flowchart of the computer system architecture according to a preferred embodiment of the invention is shown. As illustrated in FIG. 9, since the CPU 240 spends too much time in carrying out other tasks, the returned information of the frame 1 is already stored in the second buffer 220 but the returned information of the frame 0 stored in the first buffer 210 has not yet been read, the first occupancy flag is not yet eliminated. Thus, the video decoder, after judging that both the first occupancy flag and the second occupancy flag are not eliminated, will pause operation until the CPU 240 reads the returned information of the frame 0 and eliminates the first occupancy flag. Then, the video decoder continues to decode the frame 2. Through the above procedures, the CPU 240 can control the decoding progress of the video decoder and the audio decoder, so as to achieve AV synchronization.

In the above embodiments, during the period between the time when the CPU 240 receives an interruption notice of the video decoder and the time when the CPU 240 processes the interruption, the video decoder still can continue decoding, so that the idle time spent in waiting system service is eliminated, and the overall system efficiency is thus increased.

The computer system architecture disclosed in above embodiments of the invention has many advantages exemplified below:

The computer system architecture of the invention enables multiple sub-systems to operate independently and effectively under the switching overhead required for the switching of the multiplex operating system, so as to achieve independent system control and further achieve no-loading self-control and system control. Thus, the efficiency of the sub-system is increased, and the overall operating efficiency of complicated operating system and environment with excessive application software is also improved.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computer system architecture, comprising:
   a memory;
   a sub-system used for carrying out a first task to obtain a first returned information; and
   a CPU used for reading the first returned information of the first task stored in a storage space when the first task is completed by the sub-system;
   wherein, when the CPU writes an update setting to the memory, sets up a value to an update flag for indicating that the update setting exists in the memory and outputs an interruption instruction to the sub-system, the sub-system pauses the first task so as to read the update setting from the memory and load the update setting into the sub-system; and
   before carrying out each task, the sub-system checks whether the storage space is full and checks, in response to the storage space being determined as still being available, whether the update flag indicates that the update setting exists in the memory, and the sub-system loads in the update setting before carrying out a next task.

2. The computer system architecture according to claim 1, wherein
   the storage space comprises a first buffer and a second buffer;
   the sub-system is configured for carrying out the first task to obtain the first returned information, storing the first returned information in the first buffer, setting up a first occupancy flag to the first buffer, carrying out a second task to obtain a second returned information, storing the second returned information in the second buffer, and setting up a second occupancy flag to the second buffer;
   the CPU reads the first returned information from the first buffer, and eliminates the first occupancy flag when the first returned information is read by the CPU; and
   the sub-system judges whether neither the first occupancy flag nor the second occupancy flag which have been set up is eliminated, and when the sub-system judges that neither of the set up first occupancy flag and second occupancy flag is eliminated, the sub-system pauses the first task and the second task until the CPU reads the first returned information and eliminates the first occupancy flag.

3. The computer system architecture according to claim 2, wherein,
   after the second returned information is stored in the second buffer and the first occupancy flag is eliminated, the sub-system carries out a third task to obtain a third returned information, and stores the third returned information in the first buffer, and sets up the first occupancy flag to the first buffer;
   the CPU further reads the second returned information from the second buffer and eliminates the second occupancy flag, and after the third returned information is stored in the first buffer and the second occupancy flag is eliminated, the sub-system carries out a fourth frame to obtain a fourth returned information, stores the fourth returned information in the second buffer, and sets up the second occupancy flag to the second buffer.

4. The computer system architecture according to claim 3, wherein when the third returned information is stored in the first buffer but the second occupancy flag is not yet eliminated, the sub-system pauses the third task and the fourth task until the second occupancy flag is eliminated.

5. The computer system architecture according to claim 2, further comprising:
   means for making a determination that the first occupancy flag is not set up to the first buffer or the second occupancy flag is not set up to the second buffer, wherein the sub-system loads the update setting stored in the memory in response to said determination.

6. The computer system architecture according to claim 2, wherein the sub-system, without waiting for the CPU to read the first returned information, carries out the second task to obtain the second returned information after the first returned information is stored in the first buffer, and when the second returned information is stored in the second buffer but the first occupancy flag is not yet eliminated, the sub-system pauses the first task and the second task until the first occupancy flag is eliminated.

7. An operating method of a computer system architecture, comprising:

carrying out a first task to obtain a first returned information by a sub-system; and reading the first returned information of the first task stored in a storage space by a CPU when the first task is completed by the sub-system;

wherein, when the CPU writes an update setting to the memory, sets up a value to an update flag for indicating that the update setting exists in the memory and outputs an interruption instruction to the sub-system, the sub-system pauses the first task so as to read the update setting from the memory and load the update setting into the sub-system; and before carrying out each task, the sub-system checks whether the storage space is full and checks, in response to the storage space being determined as still being available, whether the update flag indicates that the update setting exists in the memory, and the sub-system loads in the update setting before carrying out a next task.

8. The operating method according to claim 7, wherein the storage space comprises a first buffer and a second buffer, and the operating method further comprising:

storing the first returned information in a first buffer by the sub-system, and setting up a first occupancy flag to the first buffer;

carrying out a second task by the sub-system to obtain a second returned information, storing the second returned information in a second buffer, and setting up a second occupancy flag to the second buffer;

reading the first returned information from the first buffer by the CPU, and eliminating the first occupancy flag when the first returned information is read by the CPU; and the sub-system judges whether neither the first occupancy flag nor the second occupancy flag which have been set up is eliminated, and when the sub-system judges that neither of the set up first occupancy flag and the second occupancy flag is eliminated, the sub-system pauses the first task and the second task until the CPU reads the first returned information and eliminates the first occupancy flag.

9. The operating method according to claim 8, further comprising:

after the second returned information is stored in the second buffer and the first occupancy flag is eliminated, carrying out a third task by the sub-system to obtain a third returned information, storing the third returned information in the first buffer, and setting up the first occupancy flag to the first buffer;

reading the second returned information from the second buffer and eliminating the second occupancy flag by the CPU; and after the third returned information is stored in the first buffer and the second occupancy flag is eliminated, carrying out a fourth task to obtain a fourth returned information, storing the fourth returned information in the second buffer, and setting up the second occupancy flag to the second buffer by the sub-system.

10. The operating method according to claim 9, further comprising:

when the third returned information is stored in the first buffer but the second occupancy flag is not yet eliminated, pausing the third task and the fourth task until the second occupancy flag is eliminated by the CPU.

11. The operating method according to claim 8, wherein, wherein the sub-system, without waiting for the CPU to read the first returned information, carries out the second task to obtain the second returned information after the first returned information is stored in the first buffer, and when the second returned information is stored in the second buffer but the first occupancy flag is not yet eliminated, the sub-system pauses the first task and the second task until the first occupancy flag is eliminated.

* * * * *